(12) United States Patent
Chang

(10) Patent No.: US 9,553,628 B1
(45) Date of Patent: Jan. 24, 2017

(54) PHONE CASE CAPABLE OF MEASURING DISTANCE TO OBJECT

(71) Applicant: COMAX HARDWARE CO., LTD., Dongguan, Guangdong Province (CN)

(72) Inventor: Cheng-Hung Chang, Dongguan Guangdong Province (CN)

(73) Assignee: Comax Hardware Co., Ltd., Dongguan, Guangdong Province (CN)

( * ) Notice: Subject to any disclaimer, the term of this patent is extended or adjusted under 35 U.S.C. 154(b) by 0 days.

(21) Appl. No.: 14/955,324

(22) Filed: Dec. 1, 2015

(51) Int. Cl.
*H04M 1/00* (2006.01)
*H04B 1/38* (2015.01)
*H04B 1/04* (2006.01)
*H04B 1/3888* (2015.01)
*G01C 3/08* (2006.01)
*H02J 7/00* (2006.01)

(52) U.S. Cl.
CPC ............ *H04B 1/3888* (2013.01); *G01C 3/08* (2013.01); *H02J 7/0042* (2013.01)

(58) Field of Classification Search
CPC .................................................. H04B 1/3888

USPC ....................... 455/575.8, 575.1, 575.2, 90.3
See application file for complete search history.

(56) References Cited

U.S. PATENT DOCUMENTS

2015/0103018 A1* 4/2015 Kamin-Lyndgaard . G09G 5/006
345/173

* cited by examiner

*Primary Examiner* — Tilahun B Gesesse
(74) *Attorney, Agent, or Firm* — Alan D. Kamrath; Kamrath IP Lawfirm, P.A.

(57) ABSTRACT

A phone case capable of measuring a distance to an object contains: an accommodating cover, a protective cover, and a cell. The accommodating cover includes a first orifice defined on a front end thereof and includes two locking tabs extending outwardly from two peripheral sides thereof and connecting with a smartphone. The protective cover connects with the accommodating cover and includes an aperture defined on a rear end thereof. A front end of the cell connects with a first printed circuit board (PCB) for measuring a distance to an object, and a rear end of the cell couples with a second printed circuit board (PCB) for controlling a power supply. The first PCB has an infrared ray (IR) receiver, and the second PCB has a charging connector electrically connected with the smartphone and has a button mounted on a bottom thereof.

2 Claims, 3 Drawing Sheets

PHONE CASE CAPABLE OF MEASURING DISTANCE TO OBJECT

FIELD OF THE INVENTION

The present invention relates to a phone case which is capable of measuring a distance to an object easily.

BACKGROUND OF THE INVENTION

A conventional laser rangefinder uses a laser beam to measure a distance to an object, but it is portable troublesomely.

The present invention has arisen to mitigate and/or obviate the afore-described disadvantages.

SUMMARY OF THE INVENTION

The primary objective of the present invention is to provide a phone case which is capable of measuring a distance to an object easily.

Another objective of the present invention is to provide a phone case which charges an electricity of a smartphone by connecting a second orifice of the phone case with an electricity charger.

DETAILED DESCRIPTION OF THE PREFERRED EMBODIMENTS

Figure 1:
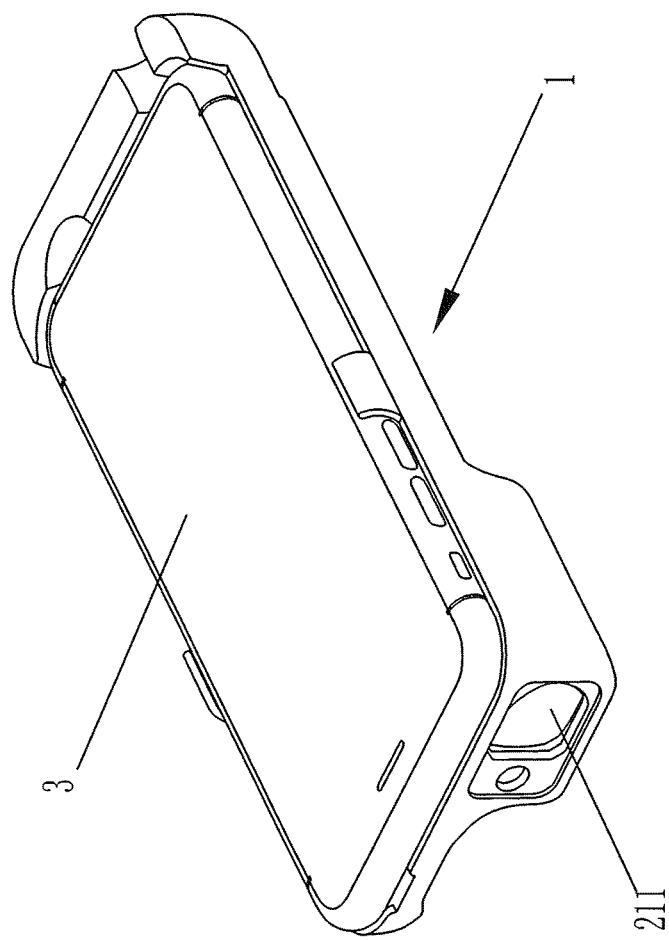
FIG. 1 is a perspective view showing the assembly of a phone case capable of measuring a distance to an object according to a preferred embodiment of the present invention.
Figure 2:
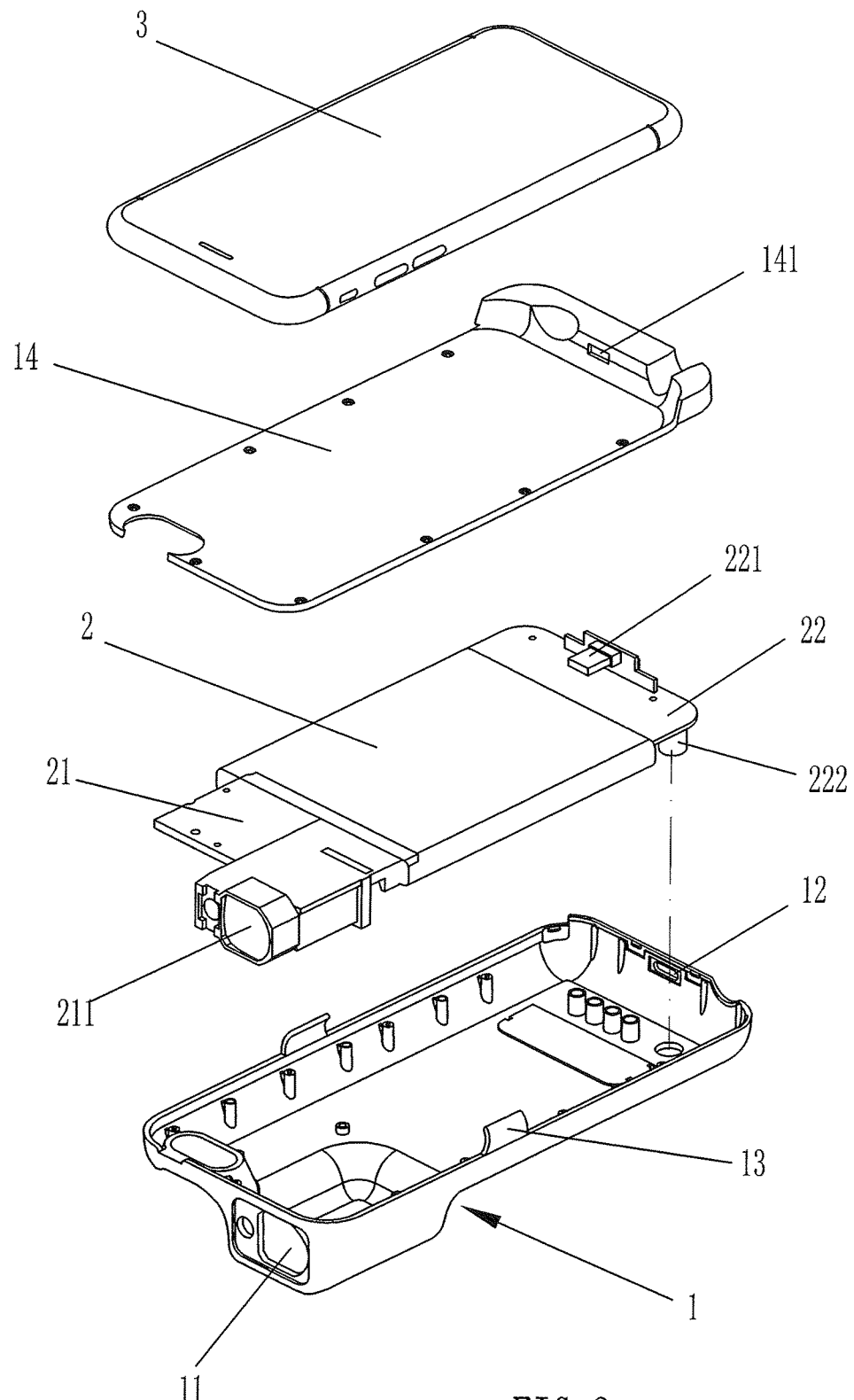
FIG. 2 is a perspective view showing the exploded components of the phone case capable of measuring the distance to the object according to the preferred embodiment of the present invention.
Figure 3:
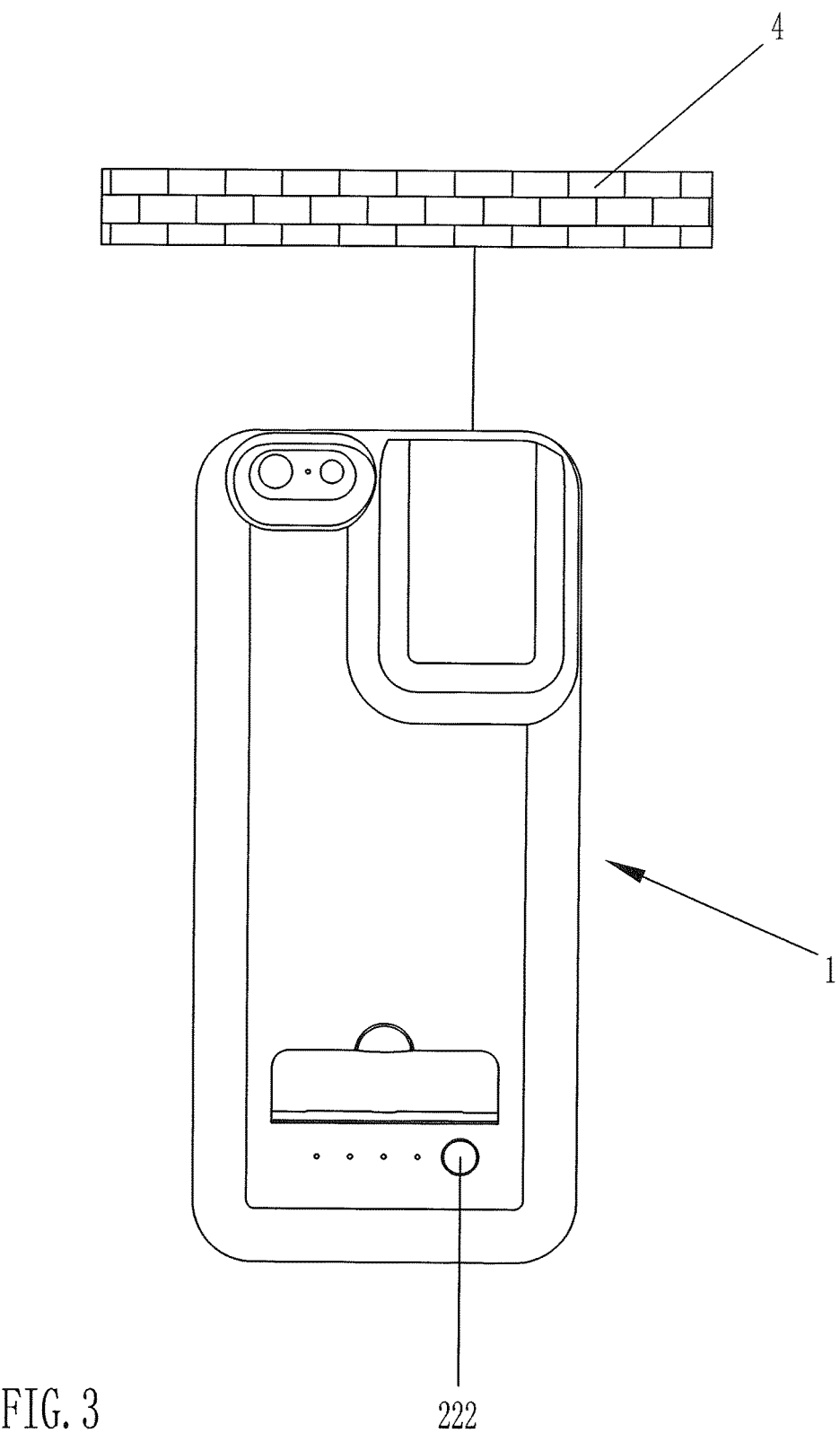
FIG. 3 is a side plane view showing the assembly of the phone case capable of measuring the distance to the object according to the preferred embodiment of the present invention.

Referring to FIGS. 1 to 3, a phone case capable of measuring a distance to an object according to a preferred embodiment of the present invention comprises:
an accommodating cover 1 including a first orifice 11 defined on a front end thereof, a second orifice 12 formed on a rear end thereof, and two locking tabs 13 extending outwardly from two peripheral sides thereof and connecting with a smartphone 3;
a protective cover 14 connecting with the accommodating cover 1 and including an aperture 141 defined on a rear end thereof;
a cell 2 including a front end and a rear end, and the front end of the cell 2 connecting with a first printed circuit board (PCB) 21 for measuring a distance to an object, and the rear end of the cell 2 coupling with a second printed circuit board (PCB) 22 for controlling a power supply;
wherein the first PCB 21 has an infrared ray (IR) receiver 211 fixed thereon; and
wherein the second PCB 22 has a charging connector 221 electrically connected with the smartphone 3 so as to charge electricity, and the second PCB 22 also has a button 222 mounted on a bottom thereof.

In operation, the button 222 is pressed, and the IR receiver 211 on the smartphone 3 is aligned with the object (such as a wall 4), and bluetooth of the smartphone 3 sends a signal to APP of the smartphone 3 so that an application program of the smartphone 3 calculates the distance to the object and an area of the object, thus measuring the distance to the object easily and quickly.

Furthermore, an electricity of the smartphone 3 is charged by connecting the second orifice 12 with an electricity charger.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A phone with case capable of measuring a distance to an object comprising:
an accommodating cover including a first orifice defined on a front end thereof, with the accommodating cover also including two locking tabs extending outwardly from two peripheral sides thereof and connecting with a smartphone;
a protective cover connecting with the accommodating cover and including an aperture defined on a rear end thereof;
a cell including a front end and a rear end, with the front end of the cell connecting with a first printed circuit board (PCB) for measuring a distance to an object, and with the rear end of the cell coupling with a second printed circuit board (PCB) for controlling a power supply;
wherein the first PCB has an infrared ray (IR) receiver fixed thereon;
wherein the second PCB has a charging connector electrically connected with the smartphone to charge electricity, wherein the second PCB also has a button mounted on a bottom thereof and wherein when the button is pushed, the smartphone sends a signal to an application program of the smartphone to calculate the distance to the object.

2. The phone with case capable as claimed in claim 1, wherein the accommodating cover includes a second orifice formed on a rear end thereof, and wherein the second orifice connects with an electricity charger to charge electricity to the smartphone.

* * * * *